July 17, 1928.

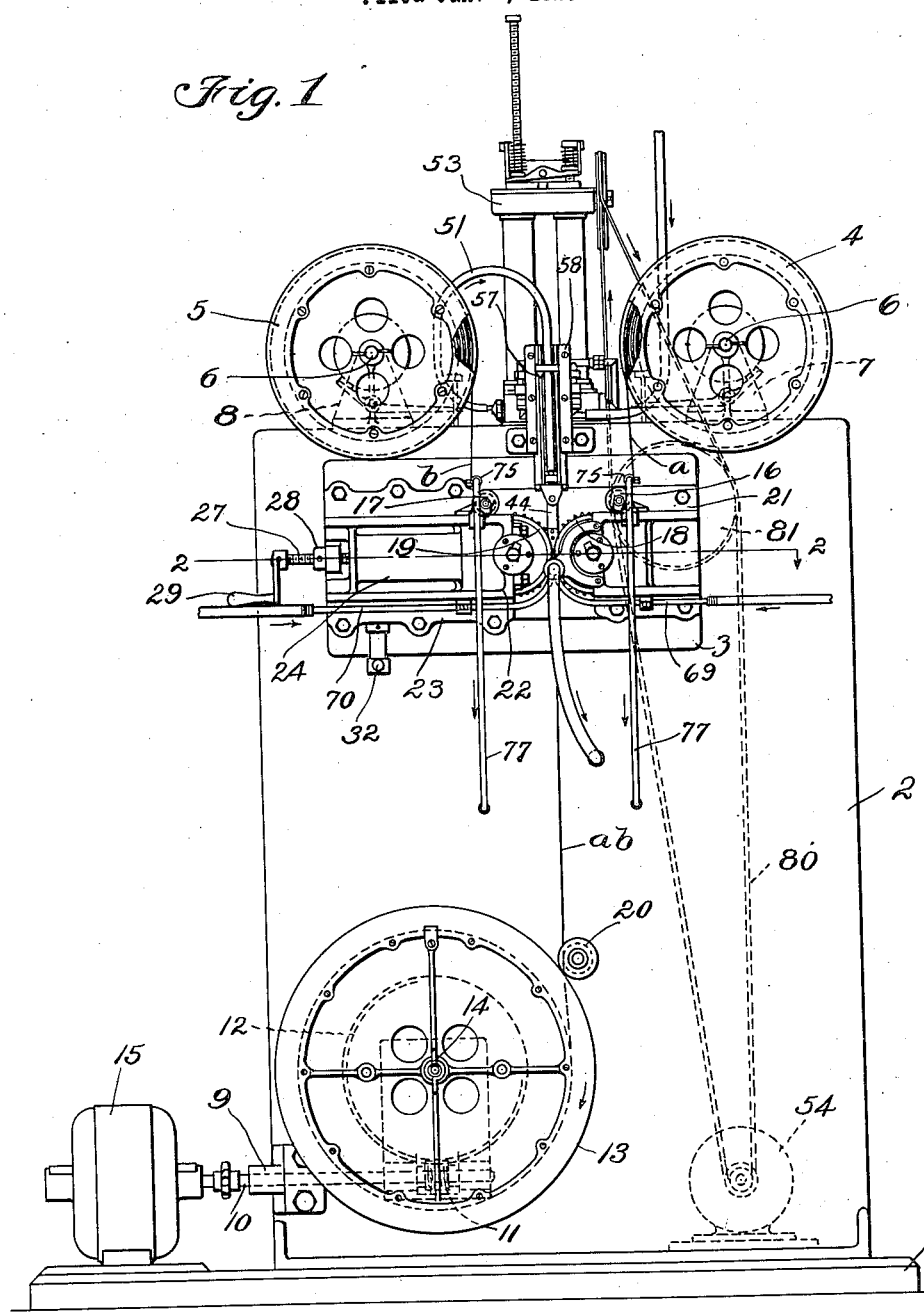

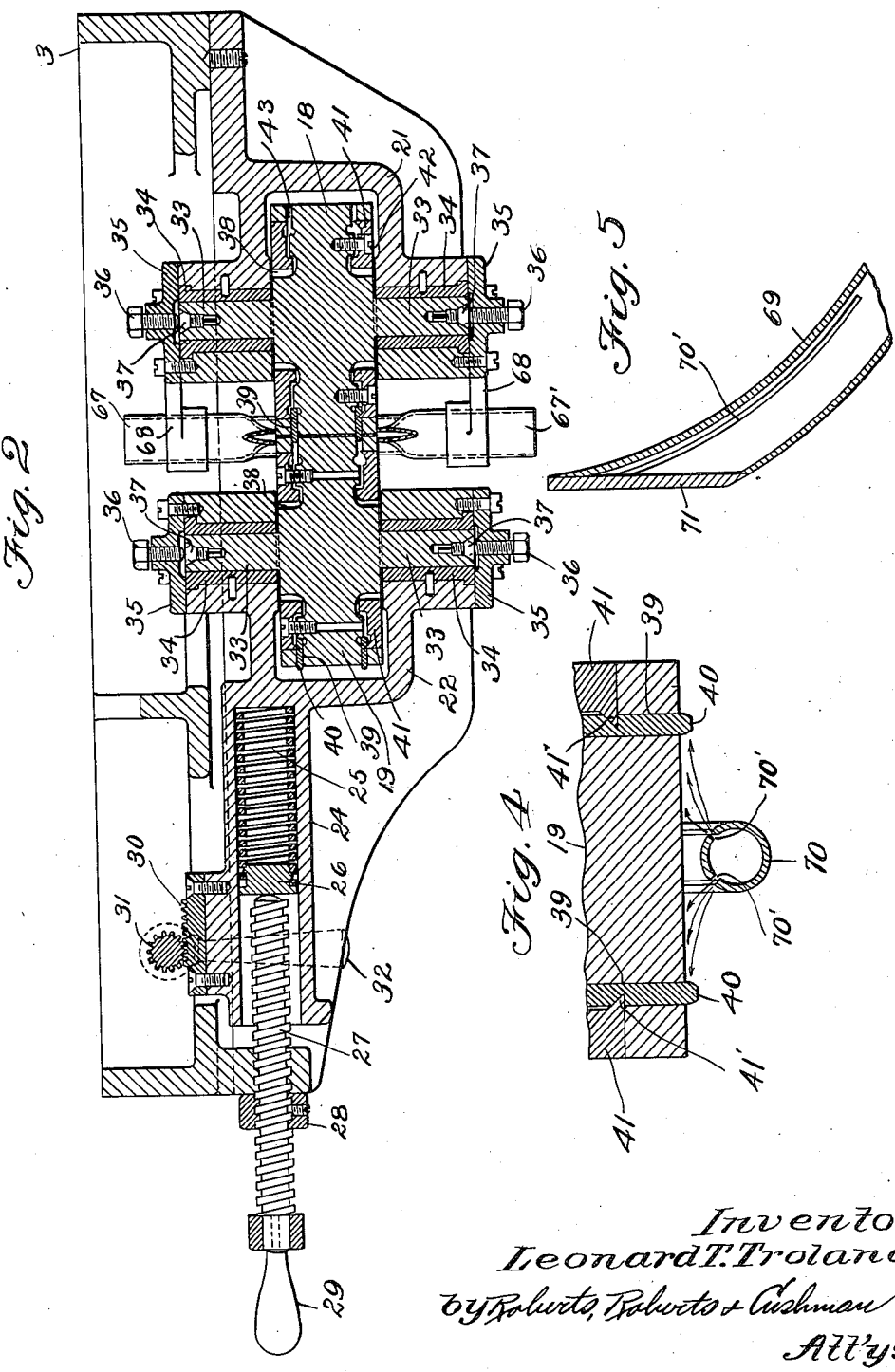

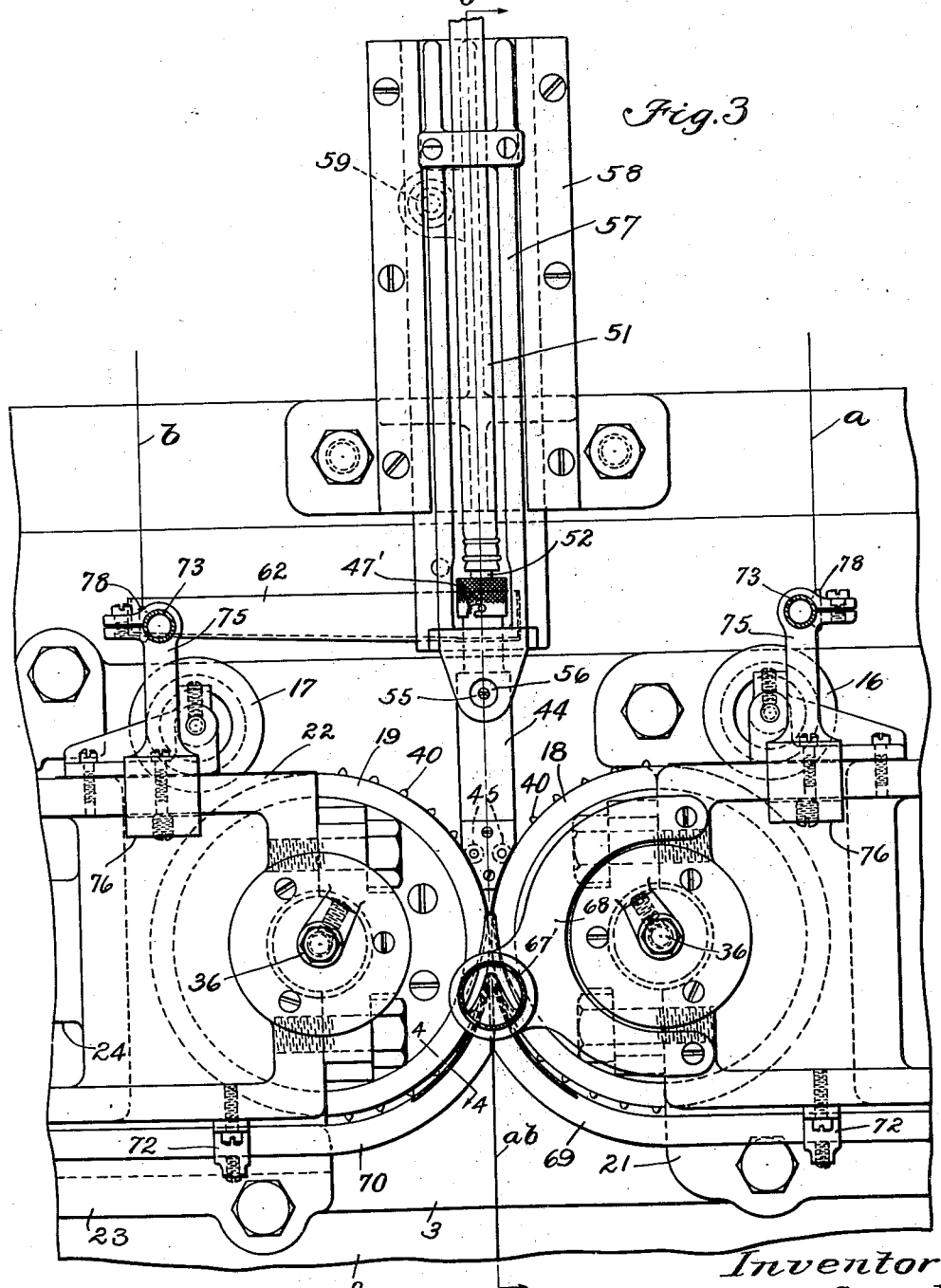

L. T. TROLAND

CINEMATOGRAPHIC APPARATUS

Filed Jan. 6, 1925

Inventor
Leonard T. Troland
by Roberts, Roberts & Cushman
Att'ys

July 17, 1928.  1,677,310
L. T. TROLAND
CINEMATOGRAPHIC APPARATUS
Filed Jan. 6, 1925  6 Sheets-Sheet 5
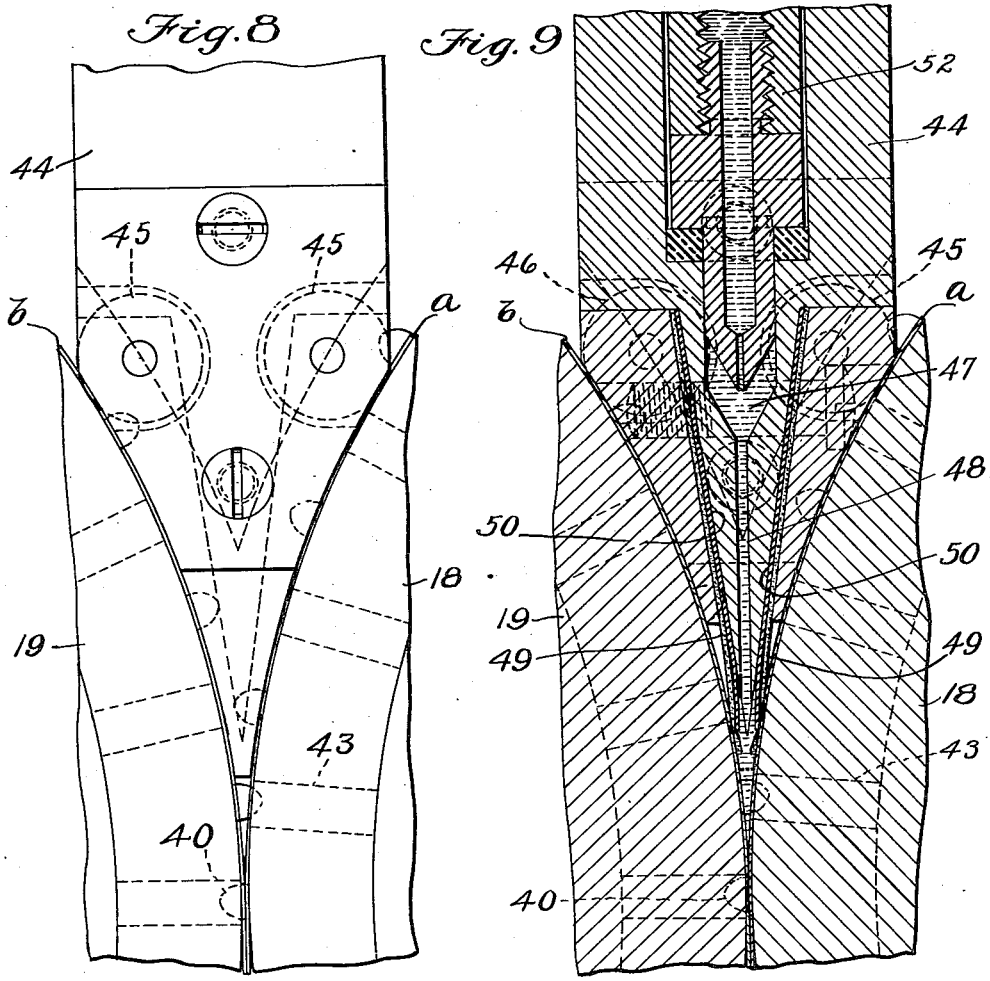
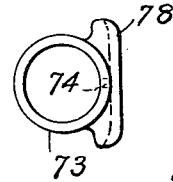
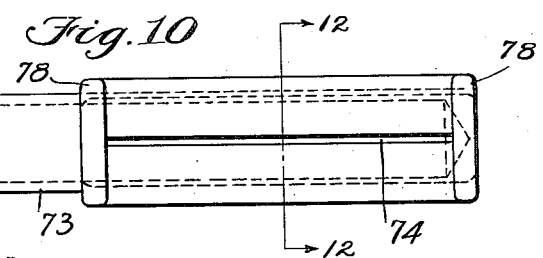
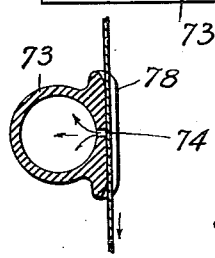
Inventor
Leonard T. Troland
by Roberts, Roberts & Cushman
Att'ys July 17, 1928. 1,677,310

L. T. TROLAND

CINEMATOGRAPHIC APPARATUS

Filed Jan. 6, 1925 6 Sheets-Sheet 6

Inventor
Leonard T. Troland
by Roberts, Roberts & Cushman
Att'ys

Patented July 17, 1928.

1,677,310

UNITED STATES PATENT OFFICE.

LEONARD T. TROLAND, OF MALDEN, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

CINEMATOGRAPHIC APPARATUS.

Application filed January 6, 1925. Serial No. 836.

This invention relates to cinematographic apparatus of the type in which a plurality of cinematographic strips are brought into registered juxtaposition or superposition for any purpose but especially for the purpose of securing such strips together in accurate registration. In some respects this invention is an improvement upon copending application, Serial No. 500,842, filed September 15, 1921, and objects are to provide an improved apparatus of the above type in which several cinematographic strips are brought into accurate registration and united together either temporarily or permanently.

The invention comprises pressure rolls which are arranged yieldingly to apply pressure to the cinematographic strips conducted therebetween and adapted to be separated from each other in such a manner that the pressure adjustment is not disturbed. The invention also provides an improved distributing plate for applying liquid to the cinematographic strips, for example cement, permanently to unite them together. The plate preferably engages one or both of the pressure rolls and is yieldingly suspended from a support although prevented from being accidentally moved away from the strips. The plate is adapted to be moved on the support away from the strips when not in use and means are provided for catching the liquid dripping from the plate in this position. The pressure rolls are continuously cleaned and the strip surfaces to be united are cleaned before liquid is applied thereto so that there will be no dust, dirt or lint between the strips after being united.

One preferred embodiment of the invention, together with a modification, is illustrated on the accompanying drawings, in which:

Fig. 1 is a front elevation of a device for uniting cinematographic strips;

Fig. 2 is a transverse section on the line 2—2 of Fig. 1;

Fig. 3 is an enlarged side elevation of the pressure rolls;

Fig. 4 is a fragmentary section on the line 4—4 of Fig. 3;

Fig. 5 is a vertical section of one of the drying nozzles for the pressure rolls;

Fig. 8 is elevation on an enlarged scale of the distributor plate and rolls;

Fig. 9 is a vertical section of the distributor plate and rolls;

Fig. 10 is a side elevation of a cleaning nozzle;

Fig. 11 is an end view of a cleaning nozzle;

Fig. 12 is a vertical section on the line 12—12 of Fig. 10;

Figures 6, 7:
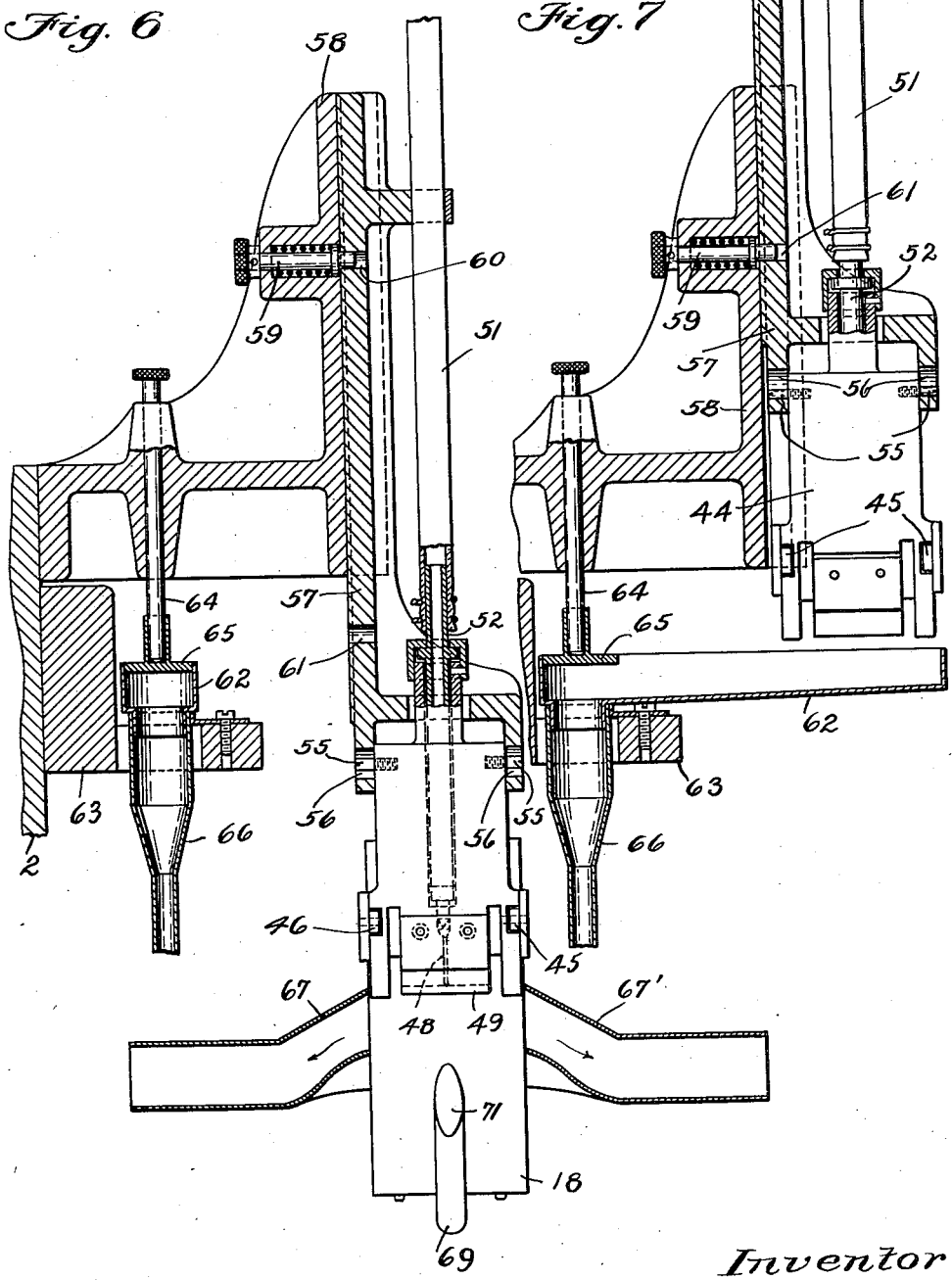
Fig. 6 is a vertical section on the line 6—6 of Fig. 3.
Fig. 7 is a view similar to Fig. 6 with the distributor plate in inoperative position.

The particular embodiment of the invention shown for the purpose of illustration comprises a base 1 and an upright support 2 to which a supporting plate 3 is suitably secured adjacent the top thereof. The cinematographic strips to be united are supported on removable reels 4 and 5, the shafts of which are mounted in suitable bearings 6 in brackets 7 and 8 on the top of the upright 2. Near the base in a suitable bearing 9 is a shaft 10 having a worm 11 meshing with a worm wheel 12 to rotate the take-up reel 13. The take-up reel is removably mounted by means of a thumb screw 14 and a motor 15 on the base 1 is connected to operate the shaft 10. The cinematographic strips $a$ and $b$ are conducted downwardly from their respective reels 4 and 5 under their respective guide rolls 16 and 17 over and between pressure rolls 18 and 19 where the strips are pressed into contact and united, issuing below as the multiple film $ab$ which extends over the guide roll 20 and thence to the take-up reel 13 by which the strips are drawn through the various parts of the machine just mentioned.

The rolls 18 and 19 are supported on brackets 21 and 22 respectively and the bracket 21 is suitably secured to the plate 2 by screws. The bracket 22 is slidable in the guide 23, which is suitably secured to the plate 3, and is provided with a tubular extension 24. A coil spring 25 in the extension 24 is adapted to apply yielding pressure to the roll 19 and is provided with a head 26 against which an adjusting screw 27 threaded into the plate 3 is adapted to bear. A stop collar 28 engages the screw 27 to serve as a marker to indicate how far the screw should be turned to effect proper spring adjustment and a handle 29 is provided for adjusting the tension of the spring 25. The roll 19 may be moved away from the roll 18 without disturbing the adjustment of the spring 25 by a rack 30 suitably secured to the extension 24 with which cooperates a pinion 31 having an operating handle 32. Thus when it is desired to apply the cinematographic strips to the pressure rolls 18 and 19, in order to clean the rolls or for any other reason, the roll 19 can be moved away from the roll 18 by manipulating the handle 32 and the adjustment of the screw 27 remains unchanged. The rolls 18 and 19 have integral trunnions 33 which rotate in bushings 34 prevented from turning in bearing brackets 21 and 22 by pins (Fig. 2). Plates 35 are secured to the brackets 21 and 22 and adjusting screws 36 are threaded into plates 35 to bear against filling screws 37 in the trunnions so that axial adjustment of the rolls 18 and 19 with respect to each other may be effected.

Undercut surfaces defining annular grooves 38 are provided in each of the rolls and the projecting portions of the rims left by the undercuts are provided with holes 39 extending into grooves 38 for housing the removable registering pins 40. The pins 40 are provided with notches 40' for receiving the sharp edge 41' of a ring 41 which is secured in each of the grooves 38 by screws 42. Alternating with the holes 39 around the periphery of the pressure rolls are shallow recesses 43 for receiving the projecting ends of the registering pins 40 which are arranged in pairs alternating with the recesses on each roll. As shown in Figs. 8 and 9 the recesses 43 are larger than the ends of the pins 40 so that the pins do not engage the sockets at any time. The projecting ends of the pins 40 on one side of the rolls may be shaped to fill the sprocket holes of the cinematographic strips $a$ and $b$ only longitudinally and not transversely of the films, thus affording clearance to take care of shrinkage or expansion of the strips transversely.

The films $a$ and $b$ are threaded over the rolls 18 and 19 and are positively pulled downward by the driven take-up wheel 13. This pull of the strips rotates the pressure rolls 18 and 19 which are geared together by the strips through the arrangement of the alternately disposed registering pins 40. Foreign particles such as lint and dust are removed from the surface of the strips to which cement is to be applied before passing between the pressure rolls 18 and 19 by suction nozzles 73 (Figs. 3 and 10 to 12) having slots 74 extending the entire width of the strips and ribs 78 on opposite sides of the nozzles to guide the strips. The nozzles 73 are supported in brackets 75 having saddle clamps 76 engaging the brackets 21 and 22 and ducts 77 connect the nozzles with any suitable source for creating a suction.

The means for applying liquid to the strips comprises a distributor plate 44 which is pointed at its lower end to fit between the pressure rolls 18 and 19 as indicated in Figs. 8 and 9 and rollers 45 and 46 are mounted on the distributor plate to bear against the pressure rolls 18 and 19 outside the margins of the films. Liquid is supplied from a recess 47 in plate 44 through a central passage 48 and strips of chamois 49 yieldingly held against the cinematographic strips by flat springs 50 become saturated with liquid and aid in distributing the liquid evenly over the strips $a$ and $b$ as well as cleaning the films. The liquid is introduced into the recess 47 in a fine continuous stream through a flexible duct 51 from a pump 53 which is driven by a motor 54 and through a nozzle 52 removably held in the recess 47 by a collar 47' having a bayonet joint. The pump may be any suitable type but preferably of the type described and claimed in copending application Serial No. 922 filed on even date herewith. A minute pool of liquid is preferably maintained in the space between the lower end of the distributor plate and the junction of the films, and suction nozzles 67, 67' are provided at the sides of the rolls to draw the liquid out to the edges of the films and thereby insure distribution of the liquid over the entire areas of the opposed faces of the films. These suction nozzles 67 and 67' are located adjacent the edges of the strips $a$ and $b$ and supported on supports 68 secured by screws to the bracket 21. These nozzles also function to remove any excess cement that may squeeze out at the edges, although it is desirable to avoid substantial excess of cement in order to produce the requisite composite film.

The distributor plate is supported by pins 55 freely movable in holes 56 in a slide 57 which is vertically movable between guides 58 secured to the upright 2. A spring pressed plunger 59 in one of the guide plates 58 is adapted to be inserted into a hole 60 in the slide 57 for locking the distributor plate in operative position between the strips $a$ and $b$. By moving the distributor plate upwardly by means of the slide the plunger 59 may be inserted into a hole 61 in the slide and lock the plate away from the strips (Fig. 7).

Means are provided for collecting the liquid from the distributor plate when moved away from the pressure rolls 18 and 19 and for this purpose a drip pan 62 is pivotally supported on a bracket 63 secured to the upright 2 and by a pin 64 extending into a socket in a plate 65. The bottom of the pan inclines toward an outlet 66 which may lead to any suitable place and the pan 62 is adapted to be swung beneath the distributor plate 44 when moved away from the pressure rolls 18 and 19 so that the liquid will drip into the pan and flow into the outlet.

The surfaces of the pressure rolls 18 and 19 must be kept perfectly clean and dry to prevent sticking of the cinematographic strips thereto and to avoid unequal or localized pressures on the strips as the latter are pressed together. Two forms of mechanism for this purpose are disclosed herein. As shown in Figs. 1, 3, 4 and 5 the pressure rolls are continuously cleaned by blow nozzles 69 and 70 which extend part way around the peripheries of the rolls and provide pairs of elongate slots 70' (Fig. 4) through which air is blown upon the surface of the rolls to prevent the cinematographic strips from sticking thereto. The ends of the nozzles are closed by plates 71 (Fig. 5) between which the composite film $ab$ passes and supports 72 secured to the brackets 21 and 22 hold the blow nozzles in proper position.

Figure 13:
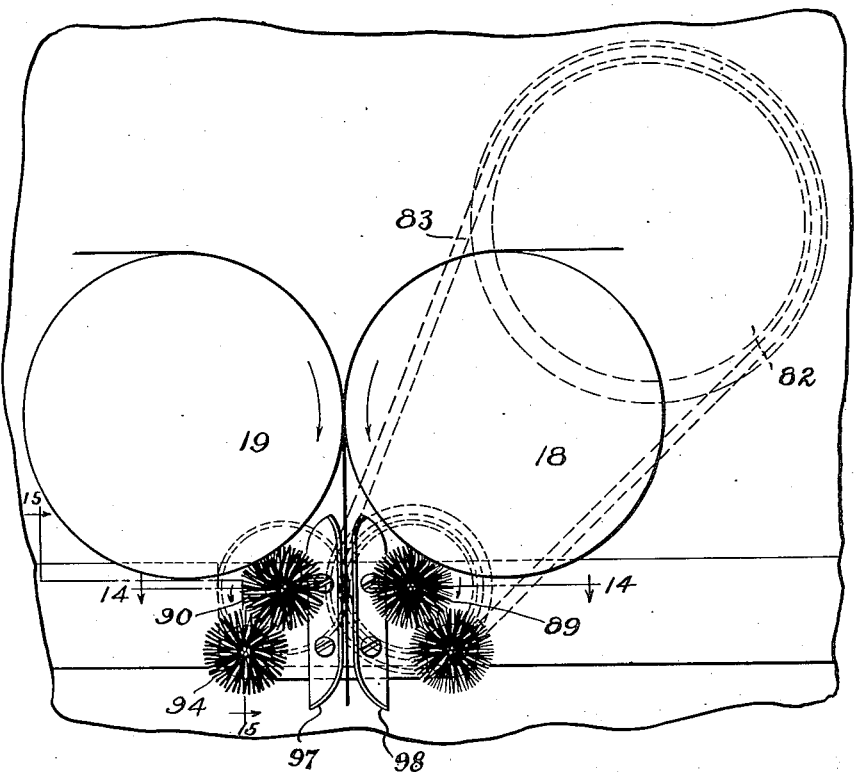
Fig. 13 is a view, diagrammatic in part, of another form of roll cleaning mechanism.
Figure 14:
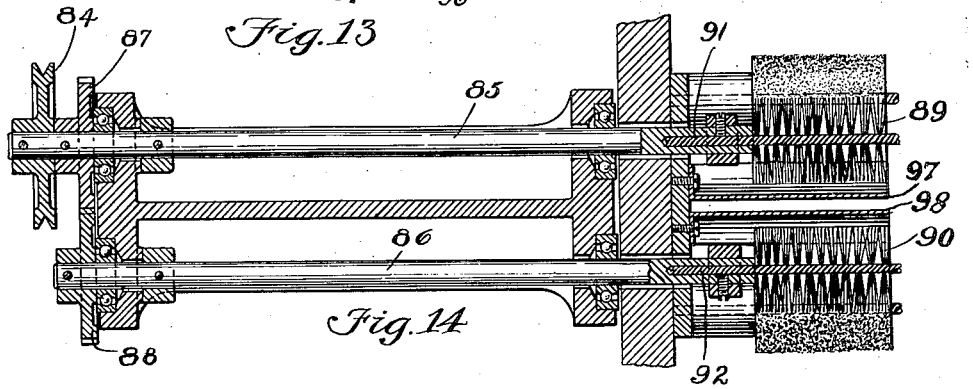
Fig. 14 is a horizontal section on the line 14—14 of Fig. 13.
Figure 15:
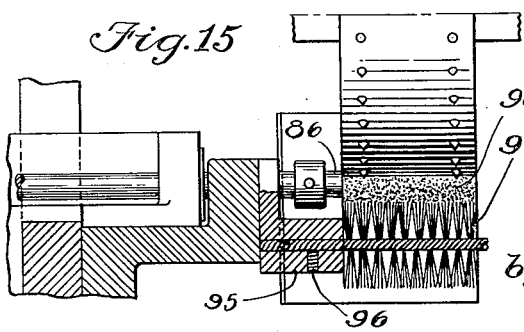
Fig. 15 is a vertical section on the line 15—15 of Fig. 13.

Under some circumstances difficulty with minute "bubbles" between the united strips $ab$ has been encountered and this is attributed to chipping off of particles of emulsion at the sprocket holes and their lodgment on the peripheries of the rolls 18, 19 where they form small prominences which act under the heavy pressures between the rolls to squeeze out the cement or solvent between the strips over a small area, with the result that when this localized pressure is relieved and the strip resumes its normal plane condition a small "bubble" is left. When the nozzles 69 and 70 are ineffective to keep the surfaces of the rolls clean, a more positive mechanism may be provided. This may assume the form shown in Figs. 13, 14 and 15. The motor 54 which drives the pump 53 is connected to the latter by a flexible belt 80 which passes over a pulley 81 at a point between the motor and pump. Coaxial with and driven by the pulley 81 is a driving pulley 82 which drives through a belt 83 a pulley 84 upon a horizontal shaft 85. The shaft 85 and a parallel shaft 86, which are interconnected by gears 87 and 88, are journaled below and between the axes of rotation of the rolls 18 and 19 in positions such that wire brushes 89 and 90, carried in sockets 91 and 92 at the ends of the shafts 85 and 86, may engage the surfaces of the rolls and positively sweep therefrom any matter which might otherwise adhere thereto. To clean the brushes 89, 90, stationary brushes 93 and 94 are mounted in clamps 95 in positions to be engaged by the wires of the brushes 89, 90. By releasing set screws 96 the stationary brushes 93, 94 may be turned to present new portions to the rotating brushes as wear occurs. To prevent particles of matter freed by the brushes lodging on the combined film strip $ab$, guard or spatter plates 97, 98 are arranged on opposite sides of the strip and between the latter and the brushes. The brushes 89, 90 are so driven that their peripheries sweep over the surfaces of the drums 18, 19 in the directions of travel of the latter, but at substantially higher speed and the matter swept by the brushes is therefore directed away from the strip $ab$.

It will be seen that I have provided a construction which satisfies the objects enumerated above and one which constitutes a valuable advance in the art. While I have shown the invention in certain physical embodiments it is to be understood that modifications of the structure shown may be made by those skilled in this art without departing from my invention as expressed in the following claims.

I claim:

1. Cinematographic apparatus comprising juxtaposed pressure rolls, means for conducting a plurality of cinematographic strips between said rolls, and a distributor adjacent the region where the strips contact in yieldable contact with each of said rolls for applying liquid to said strips.

2. Cinematographic apparatus comprising opposed rolls, means for bringing cinematographic strips together between said rolls, and means for applying liquid to said strips including a distributor plate having rollers bearing on said rolls.

3. Cinematographic apparatus comprising opposed rolls, means for bringing cinematographic strips together between said rolls, and means for applying liquid to said strips including a distributor plate having rollers bearing on said rolls and absorbent means yieldably engaging said strips.

4. Cinematographic apparatus comprising juxtaposed pressure members, means for conducting a plurality of cinematographic strips between said members, means for applying liquid to said strips including means for spreading the liquid over said strips and absorbent means engaging each of said strips in the region where the strips contact.

5. Cinematographic apparatus comprising juxtaposed rolls, means for bringing cinematographic strips together between said rolls, means for applying liquid to said strips including a distributor plate, a mounting for suspending the plate in juxtaposition to the rolls permitting movement of said plate away from said rolls, and means for collecting liquid from said plate when moved away from the rolls.

6. Cinematographic apparatus comprising opposed rolls, means for bringing cinematographic strips together between said rolls, means for applying liquid to said strips including a distributor plate having rollers adapted to bear on said pressure rolls, a mounting for said plate adapted to permit slight relative movement therebetween when the plate is in operative position, and means on said mounting adapted to hold the plate away from the rolls when not in use.

7. Cinematographic apparatus comprising opposed rolls, means for bringing cinematographic strips together between said rolls, means for applying liquid to said strips including a distributor plate having rollers adapted to bear on said pressure rolls, a mounting for said plate adapted to loosely suspend the plate therefrom in operative position, means on said mounting adapted to hold the plate away from the rolls when not in use, and a drip pan adapted to be swung beneath the plate when the plate is moved away from the rolls.

8. Cinematographic apparatus comprising juxtaposed pressure rolls, means for conducting a plurality of cinematographic strips between said rolls, and an air duct for drying said rolls adapted to blow air thereagainst after said strips have passed therebetween.

9. Cinematographic apparatus comprising juxtaposed pressure rolls, means for conducting a plurality of cinematographic strips between said rolls, means for applying cement thereto including absorbent means in yieldable contact with said strips and suction means for drawing the cement to the edges of the strips.

10. Cinematographic apparatus comprising a pair of juxtaposed rolls, removable pins having notches projecting through the rims of said rolls to extend into sprocket holes of the cinematographic strips disposed on the surface of the rolls, and rings fitting into circular recesses in said rims and extending into said notches to retain the pins in position.

11. Cinematographic apparatus comprising a pair of juxtaposed rolls, removable pins projecting through the rims of said rolls to extend into sprocket holes of the cinematographic strips conducted between said rolls, means for applying cement to said strips, and means for cleaning the strips before passing between said rolls.

12. Cinematographic apparatus comprising opposed rolls, means for conducting cinematographic strips between said rolls to be pressed into intimate contact thereby, means for applying a liquid to said strips and means for cleaning one side of said strips before passing between said rolls.

13. Cinematographic apparatus comprising opposed rolls, means for conducting cinematographic strips between said rolls to be pressed into intimate contact thereby, means for uniformly applying cement to said strips, and means for cleaning the side of said strips to which cement is applied before passing between said rolls.

14. Cinematographic apparatus comprising opposed rolls, means for conducting cinematographic strips between said rolls to be pressed into intimate contact thereby, suction means for uniformly distributing cement over said strips, and means for cleaning the side of said strips to which cement is applied before passing between said rolls.

15. Cinematographic apparatus comprising juxtaposed rolls, means for conducting a cinematographic strip between said rolls to be pressed into intimate contact thereby, means for applying liquid to said strip and a suction nozzle adapted to serve as a guide for said strip and clean the side thereof to which liquid is to be applied before passing between said rolls.

16. Cinematographic apparatus comprising opposed rolls, means for bringing cinematographic strips together between said rolls, and means for applying liquid to said strips including a distributor plate supported by said rolls and positioned by said strips.

17. Cinematographic apparatus comprising juxtaposed pressure rolls, means for bringing cinematographic strips together between said rolls to be pressed into intimate contact thereby, means for uniformly applying liquid to said strips, and cleansing means for said rolls arranged at opposite sides of said strips as they issue together from said rolls and operative to direct material removed from said rolls during the cleansing process in directions away from said strips.

Signed by me at Boston, Mass., this 11th day of November, 1924.

LEONARD T. TROLAND.